(12) United States Patent
Zeltner

(10) Patent No.: US 7,214,904 B2
(45) Date of Patent: May 8, 2007

(54) METHOD AND APPARATUS FOR LASER DRILLING WITH A JET NOZZLE

(75) Inventor: Urs Zeltner, Schoenenwerd (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/206,075

(22) Filed: Aug. 18, 2005

(65) Prior Publication Data
US 2006/0037946 A1 Feb. 23, 2006

(30) Foreign Application Priority Data
Aug. 23, 2004 (DE) .................. 10 2004 041 273

(51) Int. Cl.
B23K 26/38 (2006.01)
B23K 26/14 (2006.01)

(52) U.S. Cl. ..................... 219/121.7; 219/121.71; 219/121.84

(58) Field of Classification Search ............ 219/121.7, 219/121.71, 121.84
See application file for complete search history.

(56) References Cited

U.S. PATENT DOCUMENTS

| | | | |
|---|---|---|---|
| 4,090,572 A | 5/1978 | Welch | |
| 4,780,592 A * | 10/1988 | Rothe et al. | 219/121.84 |
| 5,609,781 A | 3/1997 | Kaga et al. | |
| 6,204,475 B1 * | 3/2001 | Nakata et al. | 219/121.84 |
| 6,316,743 B1 | 11/2001 | Nagahori et al. | |
| 6,335,507 B1 * | 1/2002 | Nakata et al. | 219/121.84 |

FOREIGN PATENT DOCUMENTS

| | | |
|---|---|---|
| DE | 8337305 | 5/1984 |
| DE | 3637568 | 5/1988 |
| DE | 3630127 | 3/1989 |
| DE | 4016199 | 11/1991 |
| DE | 4118693 | 12/1992 |
| DE | 4402000 | 7/1995 |
| DE | 19848152 | 4/2000 |
| DE | 10138866 | 5/2003 |
| EP | 0713745 | 5/1996 |
| FR | 2828825 | * 2/2003 |
| JP | 56-136295 A | * 10/1981 |

(Continued)

OTHER PUBLICATIONS

Copy of Search Report for DE 10 2004 041 273.1 (May 17, 2005).

(Continued)

Primary Examiner—Geoffrey S. Evans
(74) Attorney, Agent, or Firm—Cermak & Kenealy, LLP; Adam J. Cermak

(57) ABSTRACT

A drilling device (1) for placing a bore hole (2) in a workpiece (3), includes a drill laser (4) that generates a laser beam (6) suitable for placing the bore hole (2), and a jet nozzle (5) for producing a gas jet (8), which flows toward the bore hole (2) and encases the laser beam (6) essentially coaxially and blows out melt (9) from the bore hole (2) and prevents a backward splashing of the melt (9) in the direction of the drilling device (1), wherein the diameter ($d_G$) of the gas jet (8), at least at the bore hole opening (10), is smaller than the diameter ($d_B$) of the bore hole (2) produced by the laser beam (6).

9 Claims, 2 Drawing Sheets

FOREIGN PATENT DOCUMENTS

| | | | | |
|---|---|---|---|---|
| JP | 61-135496 | A | * | 6/1986 |
| JP | 11-245077 | A | * | 9/1999 |
| JP | 11245077 | | | 9/1999 |
| JP | 2000-202676 | A | * | 7/2000 |
| JP | 2000-202677 | A | * | 7/2000 |

OTHER PUBLICATIONS

Copy of Search Report for European Patent Appl. No. 05107480.5 issued from the European Patent Office on Dec. 1, 2005.

* cited by examiner

METHOD AND APPARATUS FOR LASER DRILLING WITH A JET NOZZLE

This application claims priority under 35 U.S.C. § 119 to German patent application number 10 2004 041 273.1, filed 23 Aug. 2004, the entirety of which is incorporated by reference herein.

BACKGROUND OF THE INVENTION

1. Field of the Invention

The present invention relates to a drilling device for placing bore holes in workpieces.

2. Brief Description of the Related Art

Drill lasers are used increasingly for making high-precision bore holes, in particular bore holes with funnel-shaped bore hole outlets. Such drill lasers are advantageous because they are fast and highly flexible and can drill through bore holes as well as funnel-shaped bore holes. Furthermore, drill lasers can be used to drill into ceramic-coated components. Compared to customary drilling methods with twist drills, laser drilling does not generate any additional costs for drill bits that are subject to wear and tear, so that laser drilling is cheaper compared to customary drilling. Another significant advantage is the fact that laser drilling occurs contact-free and allows for bore holes with complex shapes, which is not possible with customary drilling methods.

Drill lasers emit short, high frequency light pulses for placing bore holes in workpieces. The high amount of local energy that is generated is used to remove the material or produce the bore hole due to abrupt vaporization while the molten phase is avoided.

With customary drill lasers, however, there is often the possibility that melt residue or slag deposits on the edge of the bore hole, which results in so-called "recasting." However, melt or slag residue deposits on the edge of bore holes are undesirable, since this could significantly influence the bore hole quality.

SUMMARY OF THE INVENTION

Aspects of the present invention provide an improved embodiment of an aforementioned drilling device that is used to provide high-quality bore holes.

Another aspect of the present invention includes keeping the diameter of the gas jet, at least at the bore hole opening, smaller than the diameter of the bore hole produced by the laser beam in a drilling device that has a drill laser for generating a laser beam and a jet nozzle for generating a gas jet that flows in the direction of the bore hole. The drill laser generates the laser beam that is suitable for placing the bore hole and that preferably is coaxially encased by the gas jet during the drilling process. The gas jet is used to blow out the melt or slag residue from the bore hole, as well as to protect against melt splashing back. In particular, melt should not splash in the direction of the drilling device or in the direction of a focusing device of the drilling device, since this could contaminate or damage the focusing device, such as a lens, for example.

Based on the invention's concept to keep the diameter of the gas jet smaller than the diameter of the bore hole, the gas jet flows into the bore hole during the drilling process without touching the walls of the bore hole. It preferably flows back along the bore hole walls and out of the bore hole opening, and in the process transports melt and/or slag residue out of the bore hole. Since the gas jet does not touch the bore hole edges when it streams into the bore hole, there are no undesirable swirls in this area that could create so-called dead water or flow stagnation zones in which recasting occurs. In addition, no melt or slag residue splashes back in the direction of the drilling device. Rather, non-vaporized slag or melt residue is blown off radially by the laser beam of the drill laser when blown out of the bore hole and the bore hole opening is reached. A significantly enlarged cross-section of the bore hole shows a gas stream that mainly flows in the center of the bore hole down to the base of the bore hole and back again to the bore hole opening along the walls of the bore hole. In the process it transports undesirable bore residue out.

According to a preferred embodiment exemplifying principles of the present invention, the diameter of the gas jet, at least at the bore hole opening, is approx. 64 to 85% of the diameter of the bore hole. The approximate size of the diameter of the gas jet shows that it is clearly smaller compared to the diameter of the bore hole, so that the gas jet does not make contact with the edge of the bore hole and no melt and/or slag residue remains inside the bore hole. With a gas jet diameter of approx. 65% of the diameter of the bore hole, approx. 17.5% of the diameter remains on the sides of the bore hole to accommodate a return flow from the bore hole in the opposite direction of the gas jet. This means a preferably central inflow of the gas jet into the bore hole and a flowing out along the edges with simultaneous removal, and blowing out of melt residue is accomplished.

According to a preferred exemplary embodiment, the jet nozzle is a Laval nozzle, or at least has a Laval nozzle. In general, a Laval nozzle at its flow input side has a decreasing and then increasing cross-section which ensures that the gas jet has a higher jet speed upon leaving the Laval nozzle than upon entering it. Such a Laval nozzle allows for a gas jet that enters at subsonic speed to be accelerated to supersonic speed. Depending on the embodiment, several jet nozzles or Laval nozzles can be arranged in annular fashion around the laser beam.

It is expedient for the jet nozzle to have a design that ensures that the gas jet tapers off at least up to the bore hole opening. Such a tapered embodiment of the gas jet improves the blowout behavior of slag and/or melt residue from the bore hole, since especially blown out residue is deflected radially to the outside by the laser beam of the drill laser upon reaching the bore hole opening. This is an especially effective way to prevent melt from splashing back in the direction of the drilling device. It is also feasible to additionally or alternatively have a jet nozzle design that ensures that the gas jet mainly coils around the laser beam at least up to the bore hole opening. This ensures that slag and/or melt residue is blown out in a coiled manner from the bore hole and due to centrifugal force moved away from the laser beam in a radial manner upon reaching the bore hole opening.

Other important characteristics and advantages of the present invention are disclosed in the drawings and the respective descriptions of the Figures in the drawings.

BRIEF DESCRIPTION OF THE DRAWINGS

The drawings show preferred embodiments of the invention and are explained in more detail below. Reference numbers refer to the same or similar or functionally identical components.

Schematically shown in

DETAILED DESCRIPTION OF EXEMPLARY EMBODIMENTS

Figure 1:
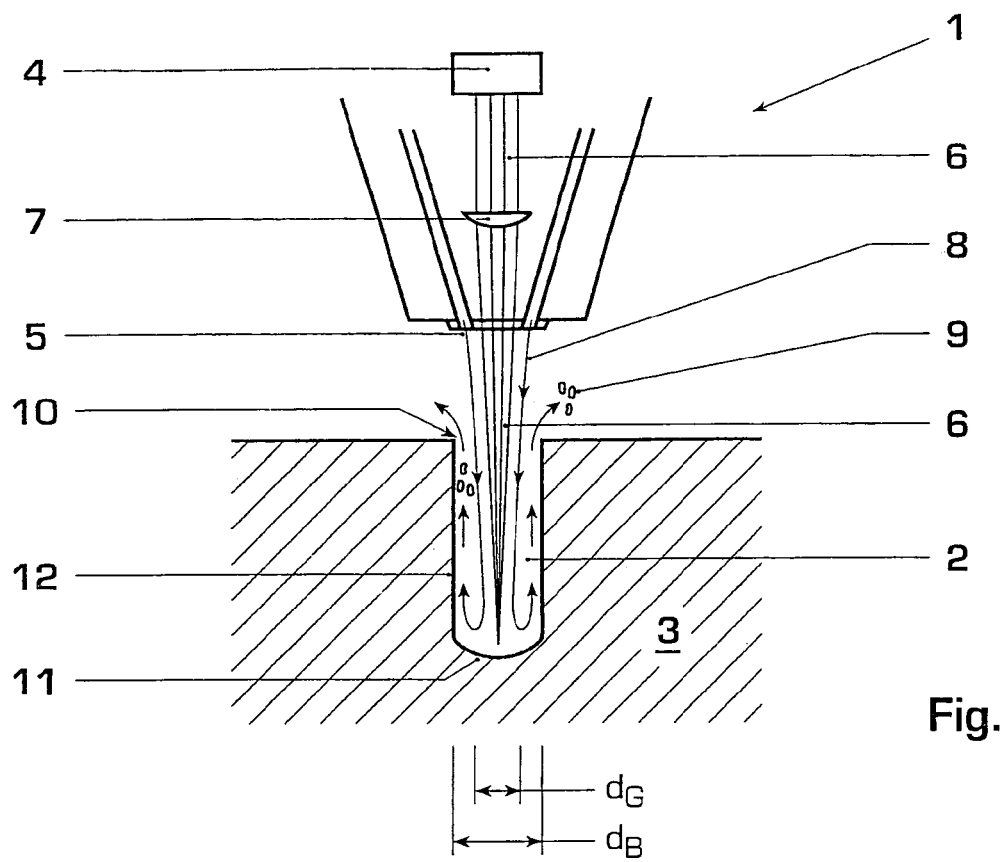
FIG. 1 a cross-section of a drill laser according to the invention and a bore hole drilled by the drill laser, FIG. 2 a presentation as shown in FIG. 1, but with a different gas jet course, FIG. 3 a presentation as shown in FIG. 1, but with a different drill laser and a different gas jet course.

According to FIG. 1, a drilling device 1 according to the invention has a drill laser 4, as well as a jet nozzle 5 for placing a bore hole 2 in a workpiece 3. Such a drilling device 1 is used for placing cooling air bore holes in engine blades, for example. In general, it is possible to have cylinder shaped bore holes 2 as well as complex shaped bore holes, for example, with a funnel-shaped bore hole opening 10. Such funnel-shaped bore hole openings 10 support the even distribution of the cooling air that exits from the bore holes 2 and thus allow for an even film cooling of turbine blades.

Speed, as well as a high degree of flexibility, characterize the drilling device 1. Furthermore, it is also possible to work on ceramic-coated components such as turbine blades. Since laser drilling in general is contact-free, there are no related tool costs with regard to drill bits that are subject to wear and tear. This means that the drilling process in general is cheaper.

The drill laser 4 generates a laser beam 6 that is suitable for placing the bore hole 2 in workpiece 3. A focusing device 7 bundles and highly concentrates the laser beam 6 prior to exiting the drilling device 1. The concentrated laser beam 6 that is comprised of high frequency and pulsed light accomplishes the actual drilling process. This can result in energies up to 50 joule and temperatures in excess of 16000 K.

The jet nozzle 5 generates a gas jet 8 that flows in the direction of the bore hole 2 and encases the laser beam 6 coaxially, blows out melt 9 from the bore hole 2 and prevents the melt 9 from splashing back in the direction of the drilling device 1. During operation of the drilling device 1 the gas jet 8 can have a flow speed that reaches or exceeds the speed of sound.

The process proposed by the invention above all is to avoid the formation of swirls that could produce dead water zones on a wall 12 of the bore hole 2 which benefits so-called "recasting," i.e., the deposit of melt 9. In order to furthermore affect an effective blowout of the bore hole 2, as well as an effective prevention of melt 9 splashing back in the direction of the drilling device 1, the diameter $d_G$ of the gas jet 8, at least at the bore hole opening 10, is smaller than the diameter $d_B$ of the bore hole 2 produced by the laser beam 6. Preferably the diameter $d_G$ of the gas jet 8, at least at the bore hole opening 10, is approx. 65 to 85% of the diameter $d_B$ of bore hole 2.

Condition $d_G<d_B$ ensures that the gas jet 8 always generates a favorable flow field in the bore hole 2 when operating the drilling device 1, which effectively blows out melt 9 and/or slag residue from the bore hole 2 and simultaneously prevents the melt 9 from splashing back in the direction of the drilling device 1.

According to FIG. 1, the gas jet 8 enters bore hole 2 in the center area and is deflected on the bottom 11 of the bore hole 2 towards the outside to the respective wall 12 of the bore hole 2. The gas jet 8 now flows in the opposite direction along the wall 12 and in the direction of the bore hole opening 10. In the process it carries the melt 9 to the outside. When the bore hole opening 10 is reached, the melt 9 that is transported from the bore hole 2 is moved out and away from the laser beam 6 in a radial manner. This ensures that it does not reach the drilling device 1 and does not contaminate or damage the focusing device 7, for example. This also avoids a swirling of the gas jet 8 as well as the generation of dead water zones that facilitate the recasting process.

Figure 2:
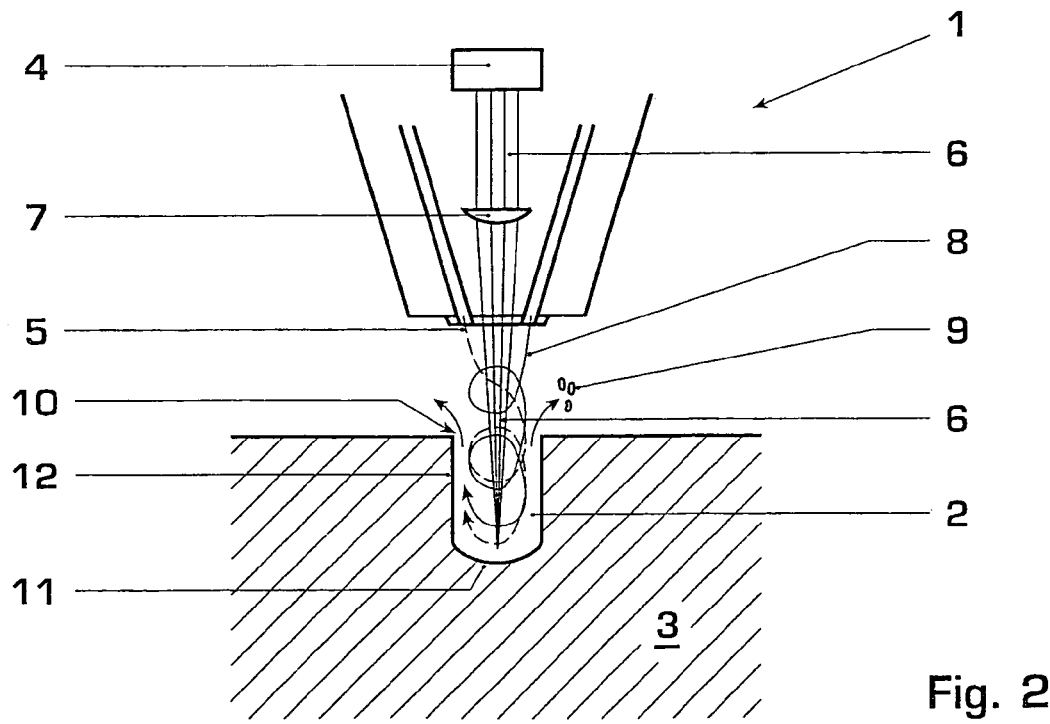

The design of the jet nozzle 5 can be such that the gas jet 8 tapers off at least up to the bore hole opening 10 (ref. FIG. 1), or such that the gas jet 8 essentially coils around the laser beam 6 up to the bore hole opening 10 (ref. FIG. 2).

Figure 3:
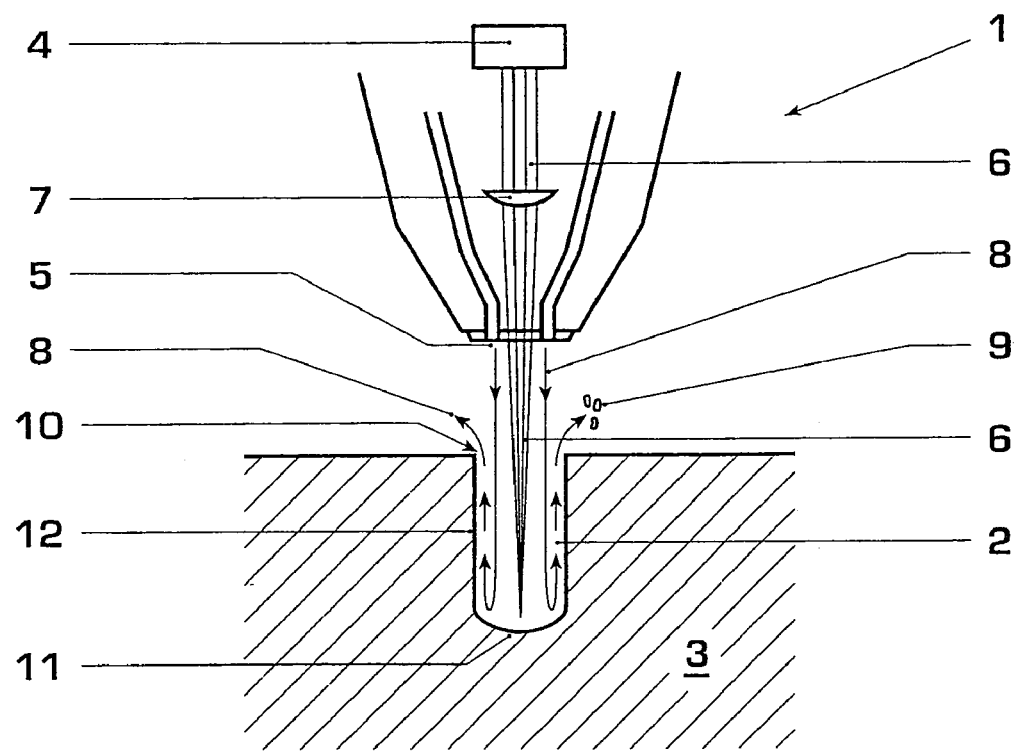

In the embodiment shown in FIG. 2, the gas jet 8 generates a swirl in the bore hole 2 that blows out drill residue such as slag or melt 9 from the bore hole 2. Due to the centrifugal forces the blown out melt 9 experiences a torsion flow which increases the radial movement away from the laser beam 6 after it exits the bore hole opening 10. In addition, it is feasible to have a jet nozzle 5 in which the gas jet 8 runs mainly parallel to the laser beam 6 at least up to the bore hole opening 10 (ref. FIG. 3).

The course of the gas jet 8 and/or the shape of the jet nozzle 5 are pure examples, which means that other shapes of the jet nozzle 5 and other courses of the gas jets 8 are included in the invention. However, all jet nozzles 5 have in common that they generate a gas jet 8 in the direction of the bore hole 2 whose diameter $d_G$, at least at the bore hole opening 10, is smaller than diameter $d_B$ of the bore hole 2 produced by the laser beam 6.

In another possible embodiment, the jet nozzle 5 is a Laval nozzle or has at least one Laval nozzle. A Laval nozzle customarily includes a converging part in which an ultrasound stream is accelerated, and a diverging part in which the supersonic stream can expand and accelerate further. It is also possible for the jet nozzle 5 to have several Laval nozzles that are arranged around the laser beam 6 in an annular fashion.

The pressure of the gas jet 8 during operation of the drilling device 1 can be up to 220 bar and thus can provide an especially effective cleaning of the bore hole 2.

The drilling device 1 in accordance with the invention thus offers several advantages: The formation of swirls is avoided that could generate dead water zones on a wall 12 of the bore hole which facilitate so-called "recasting," i.e., the deposit of melt 9. The gas jet 8 also cleans the bore hole 2 during the drilling process which results in a high-quality bore hole 2. At the same time the gas jet 8 prevents the melt 9 from splashing back in the direction of the drilling device 1 and/or the focusing device 7 and protects the device against damage. The improved blowing out of the bore hole 2 without the formation of dead water zones, as well as the protection of the drilling device 1 against splashing back melt 9, is accomplished by making the diameter $d_G$ of the gas jets 8, at least at the bore hole opening 10, smaller than the diameter $d_B$ of the bore hole that is produced by the laser beam 6. This means that there is no contact between the laser beam 6 and the wall 12 of the bore hole 2.

LIST OF REFERENCES 1 drilling device
2 bore hole
3 workpiece
4 drill laser
5 jet nozzle
6 laser beam
7 focusing device
8 gas jet
9 melt
10 bore hole opening
11 bottom of bore hole 2
12 wall of bore hole 2

$d_G$ diameter of gas jet 8 in the area of bore hole opening 10

$d_B$ diameter of bore hole 2

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

The invention claimed is:

1. A drilling device for placing a bore hole in a workpiece, the bore hole having an opening and a diameter, the drilling device comprising:
    a drill laser configured and arranged to generate a laser beam that is suitable for placing the bore hole;
    a jet nozzle configured and arranged to generate a gas jet that flows in the direction of the bore hole and encases the laser beam in a coaxial manner and blows out melt from the bore hole and prevents the melt from splashing back in the direction of the drilling device; and
    wherein the diameter ($d_G$) of the gas jet, at least at the bore hole opening, is smaller than the diameter ($d_B$) of the bore hole that is produced by the laser beam;
    wherein the jet nozzle comprises a plurality of Laval nozzles annularly arranged around the laser beam.

2. A drilling device according to claim 1, wherein the diameter ($d_G$) of the gas jet, at least at the bore hole opening, is about 65% to 85% of the diameter ($d_B$) of the bore hole.

3. A drilling device according to claim 1, wherein the jet nozzle is configured and arranged so that, during operation of the drilling device, the gas jet has a flow speed that reaches at least sonic speed.

4. A drilling device according to claim 1, wherein the jet nozzle is configured and arranged such that the gas jet tapers off at least up to the bore hole opening.

5. A drilling device according to claim 1, wherein the jet nozzle is configured and arranged such that the gas jet coils around the laser beam at least up to the bore hole opening.

6. A drilling device according to claim 1, wherein the jet nozzle is configured and arranged such that the gas jet is parallel to the laser beam at least up to the bore hole opening.

7. A drilling device according to claim 1, wherein the pressure of the gas jet is up to 220 bar.

8. A drilling device according to claim 1, wherein the drill laser comprises a pulsed laser.

9. A method of drilling a workpiece, the method comprising:
    providing a drilling device according to claim 1;
    forming at least a portion of the bore hole in the workpiece with the laser beam; and
    coaxially encasing the laser beam with the gas jet from the jet nozzle.

* * * * *